Fig. 11.

Dec. 11, 1934.                  J. B. HAWLEY                     1,984,019
            FIBROUS SOUND REPRODUCING DIAPHRAGMATIC MEMBERS
            AND MEANS FOR AND METHOD OF MAKING THE SAME
                    Filed May 25, 1932         7 Sheets-Sheet 7

Inventor:
Jesse B. Hawley
By: Wallace R. Lane.  Atty.

Patented Dec. 11, 1934

1,984,019

UNITED STATES PATENT OFFICE 1,984,019

FIBROUS SOUND REPRODUCING DIAPHRAGMATIC MEMBERS AND MEANS FOR AND METHOD OF MAKING THE SAME

Jesse B. Hawley, Geneva, Ill.

Application May 25, 1932, Serial No. 613,486

13 Claims. (Cl. 92—57)

The present invention relates to the making of sound reproducers, and more particularly the diaphragmatic member thereof.

Among the objects of the invention is to provide a novel sound reproducing member, preferably of the diaphragmatic type and of fibrous material initially deposited in accretions and interlacings into the final desired form or contour and character.

The old type of reproducing diaphragms, such as those in telephone receivers and transmitters, talking machine sound boxes, and speaker horns, are small and flat, and usually made of mica, sheet metal and the like.

A larger type, usually termed "cones", is made from a flat sheet of paper cut and developed (rolled or bent) into the form of a cone or truncated cone. The bending or rolling of the sheet imposes strains and stresses which impair the faithfulness of sound reproduction and rendition. Also, such a cone has seams, and overlaps, which are glued together, forming loaded parts and unbalanced portions of the cone, thus making it impossible for the cone to vibrate equally evenly at all points. Various parts of such a cone will vibrate out of phase with each other and cause distortions and parasitic noises. Moreover, such a cone is heavy and has considerable inertia of mass.

Another type of cone is made from sheets of woven fabric strained and deformed, as between deforming dies or the like, to a given shape, and loaded with a sizing intended to hold the fabric in the deformed shape when dried. Such an article is unduly stressed and strained. When subjected to excessive moisture, the sizing softens and weakens the article which, owing to its being under straining stresses, seeks to restore itself to its pre-deformed shape, thus resulting in a distortion of the article from its intended form, and rendering it useless as a sound reproducing member. Moreover, because of the excessive amount of sizing required to hold the cone to its deformed shape, it cannot be light in weight. It possesses a large mass inertia. It is not sensitive to sound reproduction.

The present invention overcomes and eliminates the disadvantages mentioned and inherently possessed by the diaphragms and cones above mentioned. The cone or diaphragmatic member of the present invention is made initially in its final form of fibrous material accreted and integrated preferably upon a contoured porous former so that the member is seamless, of uniform thickness throughout, and light in weight. It has no loaded parts and is therefore balanced. By reason of its lighter weight, it has very little inertia of mass, and is more easily vibrated with the result of converting the driving energy more efficiently and with truer renditions and reproductions of the original sound. By reason of its uniformity and integral unity, there are no irregular areas to distort the reproduced sound, but the latter is propagated and generated without distortions and parasitic noises. By reason of initially depositing the fibrous material in the desired final form, there is also no stress or strain imposed upon the member so that all points of the member may vibrate evenly and in phase with each other. For the same reason, the member maintains its given shape so as to remain always operative. There is no tendency for it to change to any other shape or contour or even to become distorted to any degree, because it is not deformed from any other shape or contour, and hence it remains normally of the shape it initially receives when molded or accreted.

The invention further comprehends the making of such a sound reproducing member with given densities during the molding of it so as to attain for each diaphragmatic member any desired reproduction characteristic in accordance with any response curve desired.

Another object of this invention is to provide a novel process or method of producing the diaphragmatic member above mentioned. The process, in general, comprehends the depositing and accreting of fibrous material from the fibrous bath upon a porous former of predetermined or desired shape or contour, to form a blank. It may also comprehend the controlling of the density of the material for each member, to the end of attaining any desired sound reproduction characteristic in accordance with any given response curve. This may be effected at the time of molding or accreting by the use of different pressures, or by the use of different fibrous materials or suitable mixtures thereof, or at the time of drying with or without mechanical pressures.

After the molding or accreting of the blank, the latter may be dried in any one of various ways. By one method, the blank may be dried by the drawing, as by suction, of hot gases through the blank and a porous member supporting it. By another method, the blank may first be removed from the former by suction acting through a porous contoured female die placed upon the blank, then transferring this die and blank to a drier and placing the blank on a porous male die whereby suction, acting through the male die, removes the blank from the female die, and then drawing hot gases through the blank to dry it. In the latter method, instead of drying by drawing hot gases through the blank, either a hot contoured female die may be placed upon the blank placed upon the male die, or the male die itself may be hot, and the steam, vapors, moisture and the like drawn off by suction acting through the porous male die. When it is desired to make a dense cone, the hot die may be applied under pressure to compress and compact the drying fibrous material. If it be desired to effect a less dense cone whereby the fibrous material may be softer and more or less fluffed, the hot die is merely contacted with the blank without pressure, or with very little pressure, or placed in close proximity with the surface of the blank, whereby the heat of the die may act to cause the steam in the material to fluff it, thus effecting a softer and thicker blank of the same light weight. The steam, vapors, and moisture are removed by suction acting through the male die. By a further method, the blank may be dried by the normal temperature of the atmosphere, and then a hot die applied to the blank with or without pressure, as above, to set the blank into its final desired shape.

After drying, the blank may then be treated for the purpose of imposing a characteristic of stiffness upon a part or the whole of the vibratile portion of the member, and also otherwise treating the supporting portion whereby it will be pliable and supple so as to offer practically no resistance to movement or vibration of the vibratile portion.

Another object of the invention is to compose the material of the diaphragmatic member of such fibres as will meet desired conditions in the member in accordance with given sound pressure response curves. As for example, when using southern kraft fibres, the material is stiffer and reproduces the higher frequencies of the audible range more efficiently. When using softer fibres such as soda pulp, the material is softer and produces the lower frequencies of the audible range more efficiently. By mixing the stiffer and softer materials in different proportions, any desired acoustic characteristic may be obtained to meet the acoustic effects wanted.

When a diaphragm is composed of the harder fibres, the response curve shows more prominent sound pressure peaks, particularly at the high frequency end. To the ear, such a diaphragm produces sound with comparatively greater clearness and brilliancy. When the diaphragm is composed of the softer fibres, the response curve is more regular and smoother, thus showing usually that the sound is less efficiently reproduced for the higher frequencies but more efficiently reproduced for the lower frequencies, and also that the over-all reproduction is more uniform or even. By various combinations of the harder and softer fibres, any desired acoustic effect may be produced in the resultant diaphragm.

Another object of the invention is to provide novel means for carrying out the above mentioned process and for producing the above mentioned product.

Other objects, capabilities, advantages, features and process steps are comprehended by the invention as will later appear, and as are inherently possessed by the invention.

Referring to the drawings.

Figure 1:
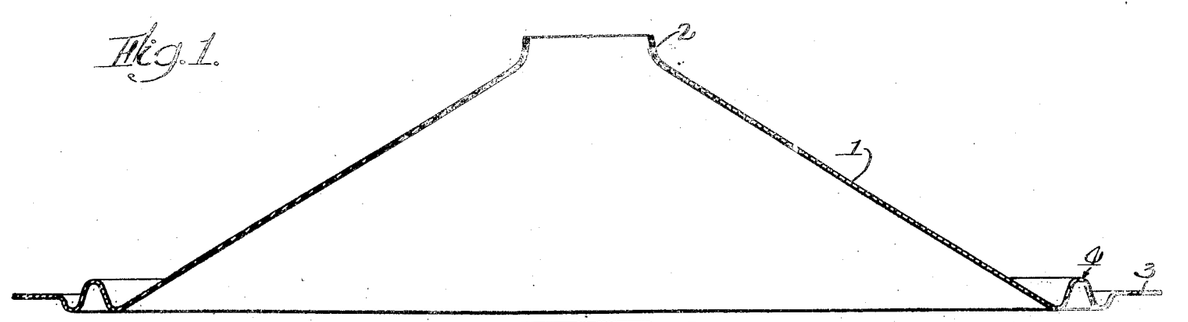
Figs. 1, 2, 3, 4, 5 and 6 are transverse sectional views of diaphragmatic members constructed in accordance with the invention.

Referring more in detail to the drawings, the diaphragmatic member constructed in accordance with the invention is shown in the form of a cone. Fig. 1 shows such a member in straight conic form and comprising a cone portion 1 which in use vibrates or constitutes the vibratile portion of the member. At the apex of the cone is provided a nipple 2 designed for the attachment thereto of a band carrying a voice coil adapted to operate in the magnetic gap of an electrodynamic driver. At the base of the member is provided a supporting portion or border 3 adapted to be clamped between supporting rings or the like of a speaker. Between the cone 1 and the supporting portion 3 is provided an undulated portion 4 constituting a flexible, pliable or supple juncture between the supporting portion 3 and the vibratile portion 1. This juncture may be compressed to enhance the pliabilty of the juncture, or it may be molded thinner or with less stock than the remainder of the cone, to have greater flexure and pliability.

Figure 2:
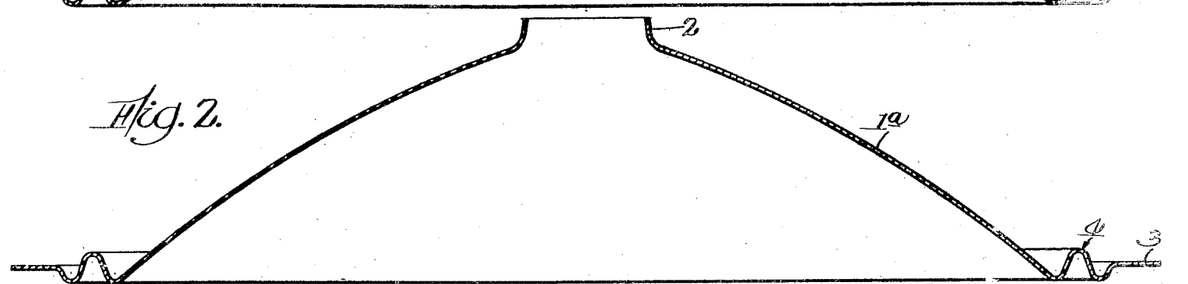

The member shown in Fig. 2 corresponds in all respects to that shown in Fig. 1 with the exception that the cone or vibratile portion 1ª is convexly curved or in the form of a convex conoid.

Figure 3:
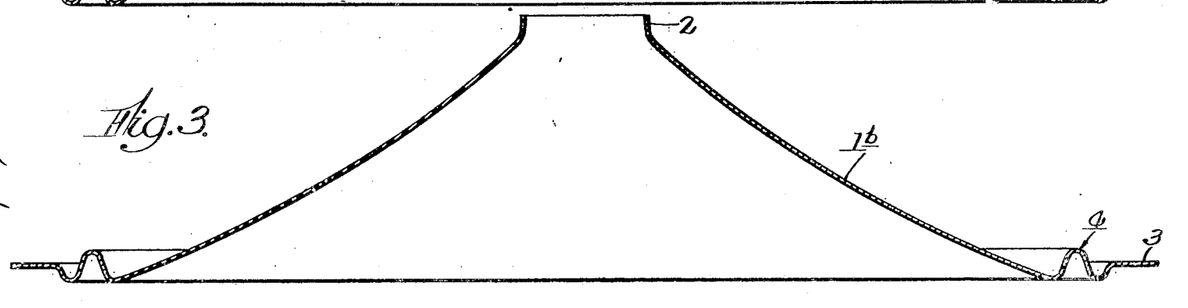

The member shown in Fig. 3 is the same in all respects with those shown in Figures 1 and 2 with the exception that the cone or vibratile portion 1ᵇ is concavely curved or in the form of a reflexed or concaved conoid.

Figure 4:
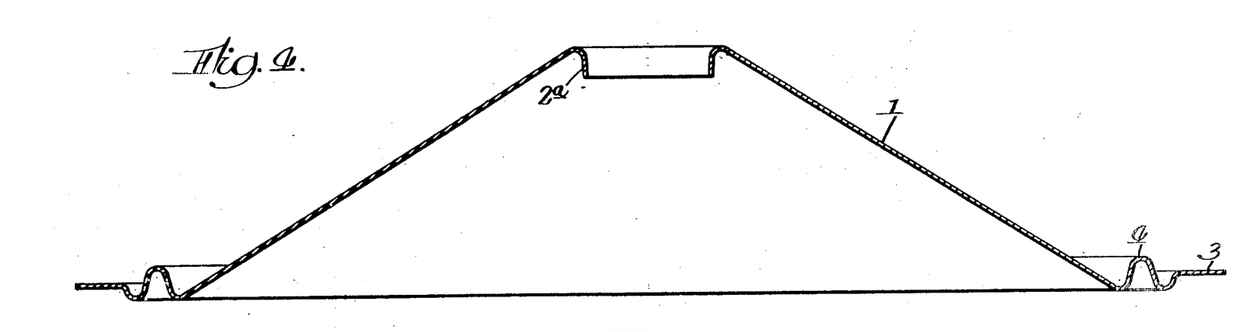
Figure 5:
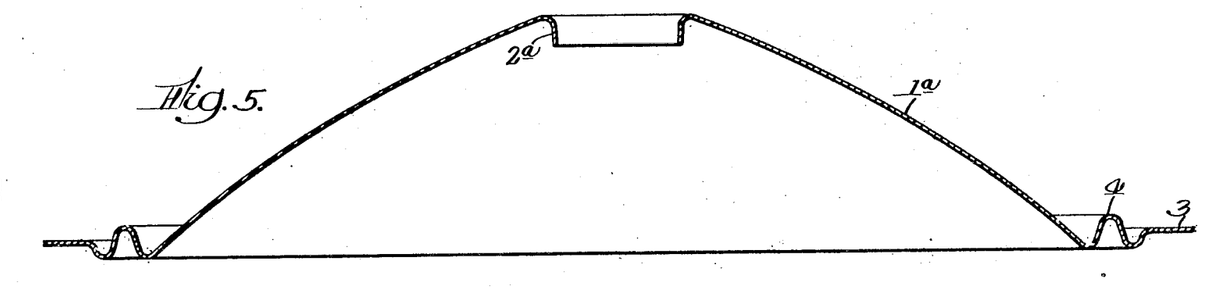
Figure 6:
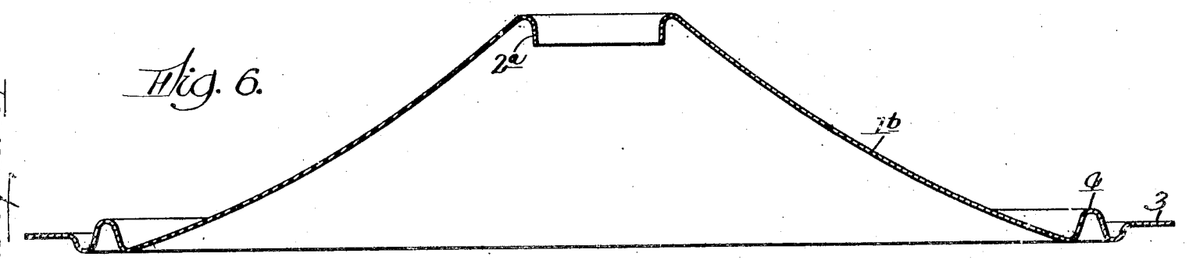

The members shown in Figs. 4, 5 and 6 are the same in all respects to those shown respectively in Figs. 1, 2 and 3 with the exception of the nipples 2ª being directed inwardly or inturned.

Figures 7, 8:
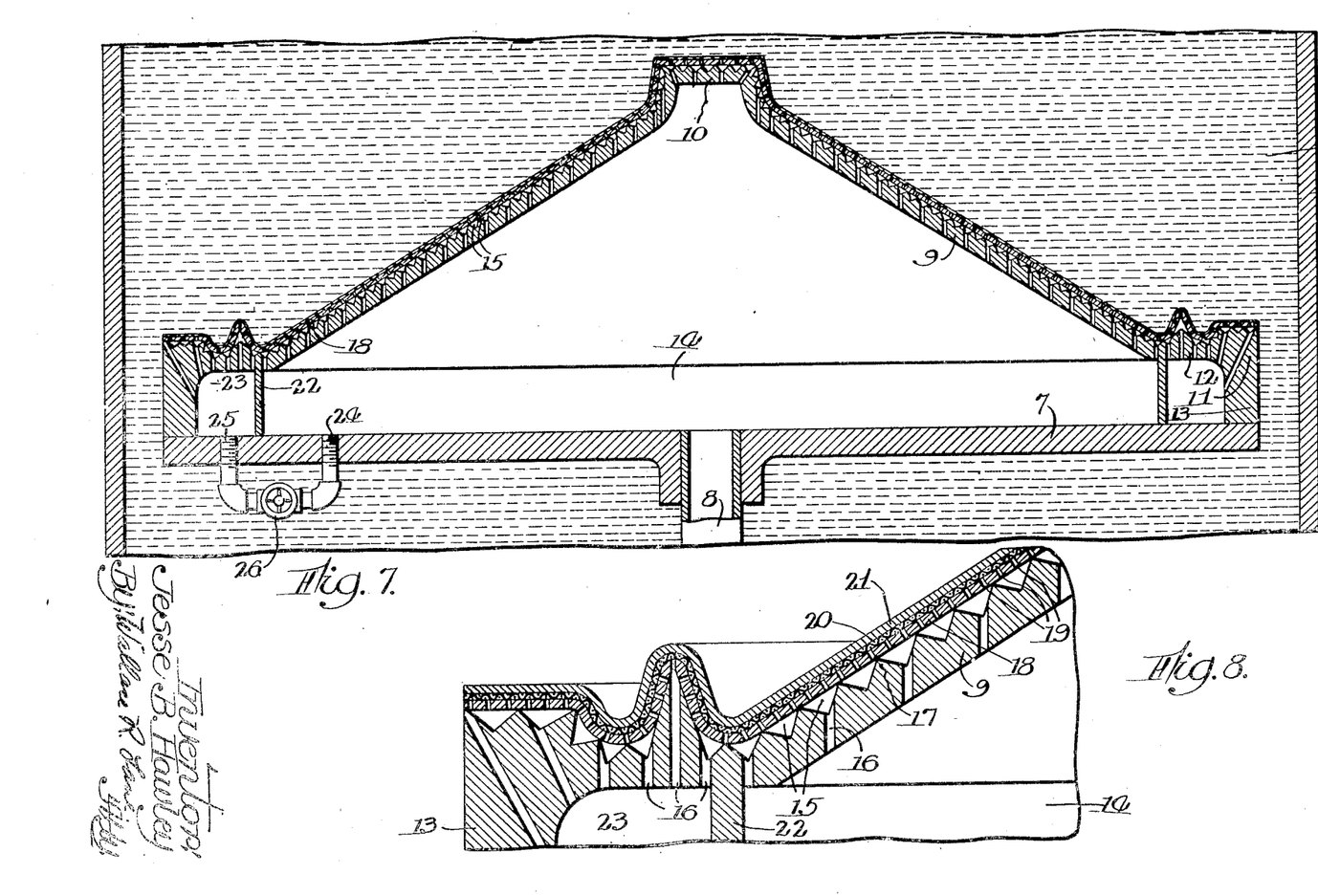
Fig. 7 is a transverse cross-sectional view of a device including a porous former for making such members as shown in Figs. 1, 2 and 3.
Fig. 8 is a fragmentary sectional view on an enlarged scale of a porous former and a fibrous deposit thereon.

Referring to Figs. 7 and 8 a device used for producing the cones above described is shown as comprising a vat or tank 5, in which is contained a bath 6 of water and fibrous material held in suspension and maintained in agitation by any suitable agitating means or medium. Within the tank is located a table 7 suitably connected to a suction pipe 8. This table and pipe are supported by any suitable means for raising and lowering the table out of the bath or into the same. The pipe 8 is suitably connected by way of a flexible duct to a source of suction.

Upon the table 7 is supported a porous former comprising a cone-shaped body portion 9, a cap portion 10, a border portion 11, an intermediate undulated portion 12, and a depending flange portion 13, the latter resting upon the table 7 and holding the former spaced therefrom so as to provide a chamber 14 in the space between the former and the table.

The outer surface of the former is provided with a number of grooves 15 communicating with apertures 16 provided in the former. These grooves and apertures function to drain away the water of the bath when the fibrous material is deposited upon the former. Between the grooves 15 are provided ridges 17 upon which is supported a contoured thin sheet 18, preferably of metal, provided with a large number of small apertures 19 throughout the sheet. This sheet is contoured to conform with the outer surfaces of the former.

Upon the sheet 18 may be located a contoured fine mesh or reticulated sheet 20, this sheet also being contoured to conform with the sheet 18. The sheet 20 is not essential and may be omitted, the molding being effected on the porous sheet 18. When the reticulated sheets 20 is used, the removal of the blank is usually more facile.

Different portions of the deposit molded upon the porous former, may be subjected to different pressures during the molding operation. For effecting this, the juncture portion 12 of the porous former, is integrally formed with a depending annular flange or partition 22 adapted to seat upon the table 7. In this way a chamber 14 is enclosed between the table 7, the conic portion of the former 9, and the partition 22, and another chamber 23 is enclosed between the flanges 13 and 22, and the table 7 and border portion 12 of the former 9. Besides being apertured to receive a suction pipe 8 the table 7 is also apertured to receive pipes 24 and 25 respectively communicating with chambers 14 and 23, and both connected to a valve 26.

In operation, the fibrous mass or bath 6 is maintained in agitation so that the fibres will be thoroughly dispersed in the fluid of the bath, such as water. With the former above the bath, the suction may be effected by way of the pipe 8 and in the chamber 14. The valve 26 may be adjusted or regulated so that the suction reaching chamber 23 via pipes 24 and 25 will be of a lesser value in chamber 23. The table 7 and the former are then rapidly submerged in the bath 6. The suction will draw the water of the bath through the interstices of the member 20, the apertures or pores 19 of the sheet 18, and through grooves 15 and aperture 16 into the chambers 14 and 23, and thence by way of the pipe 8. At the same time the fibres will be caused to accrete upon the member 20 and integrate with each other to form a layer or stratum 21 over the surface of the member 20. The fibres deposited upon the former portion over the chamber 14 will be subjected to greater force or stress than the fibres deposited upon the former portion over chamber 23, and hence the latter fibres will be more thinly accreted so that the border portion of the diaphragm will be more pliant, while the fibres deposited upon the conic portion of the former 9 will be thicker, more dense and compacted.

The same effect may be produced by providing the border and juncture portions 12 of the porous sheet 18 with smaller or fewer apertures or pores, than the conic portion of the former sheet 16. The differential of suction in chambers 14 and 23 is not necessary in this case, the valve 26 being wide open. When the suction is on, the effect of the suction on the conic sheet portion will be greater and a greater and more dense deposit will be produced thereon, while a less dense and thinner deposit will be produced upon the portion 12 of the porous sheet. The two portions of the deposited material will nevertheless be integral.

The thickness of this layer depends upon the magnitude of the suction, the time of immersion, and the percentage of fibres in the water bath. When the desired layer is accreted and integrated, the table and the former with the fibrous blank therein are rapidly raised out of the bath. The suction is preferably maintained in order to draw air through the blank for preliminarily drying the same. The suction may then be cut off and the blank dried and treated as hereinafter described.

If desired the former and the blank described, may be transferred to a heating chamber 27 (see Fig. 10) and placed upon a table 28 to which is connected a suction pipe 29. In the upper part of the heating chamber 27 may be located any suitable heating means such as a burner. The drying is effected by the production of a vacuum in the chamber 30 formed between the table 28 and the former resting thereon, and drawing the hot gases of the heater through the interstices of the blank 21 and the apertures of the former. After the blank is dried, the suction through the pipe 29 is reversed to a pressure and the air passing reversely through the apertures in the former will then blow off the blank. The blank may then be trimmed, and treated, as with water-proofing materials, and pressed at desired parts to give such parts pliability.

Figure 9:
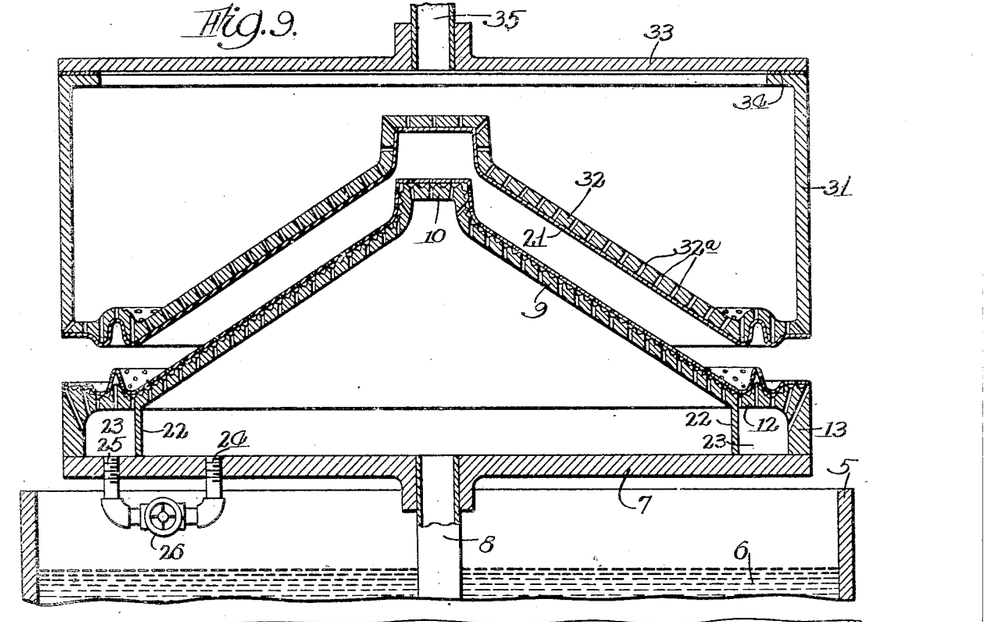
Fig. 9 is a transverse sectional view of a forming means and a means for removing a blank from the forming means.

Another way of drying is to first remove the wet blank from the former. See Fig. 9. In this case, a hollow female die 31 having a contoured face or wall 32 corresponding to the contour of the blank upon the former is brought into contact with that blank, and a suction effected in the die chamber. The contoured wall is provided with a number of apertures 32ª for the passage of air. The top of the die may have a closure plate 33 suitably secured to a flange 34 of the die. This plate also has a suction pipe or duct 35. When the suction is effected it will remove the blank from the surface of the former and cause it to cling to the contoured surface of the wall 32 of the die.

This die and the blank 21 clinging thereto, is then transferred to the heating chamber 27 and brought in position over a hollow male die 36 having a contoured face or wall 37 provided with a large number of apertures 38. This wall 37 corresponds in form to the contour of the blank 21. The suction in the female die 31 is either cut off or reversed to a pressure, and a suction is effected in the chamber 30 between the die 36 and table 28 so as to remove the blank from the female die and to cause it to cling to the male die. The female die is then removed. Its previous position is shown in dotted lines in Fig. 10 of the drawings.

Figure 10:
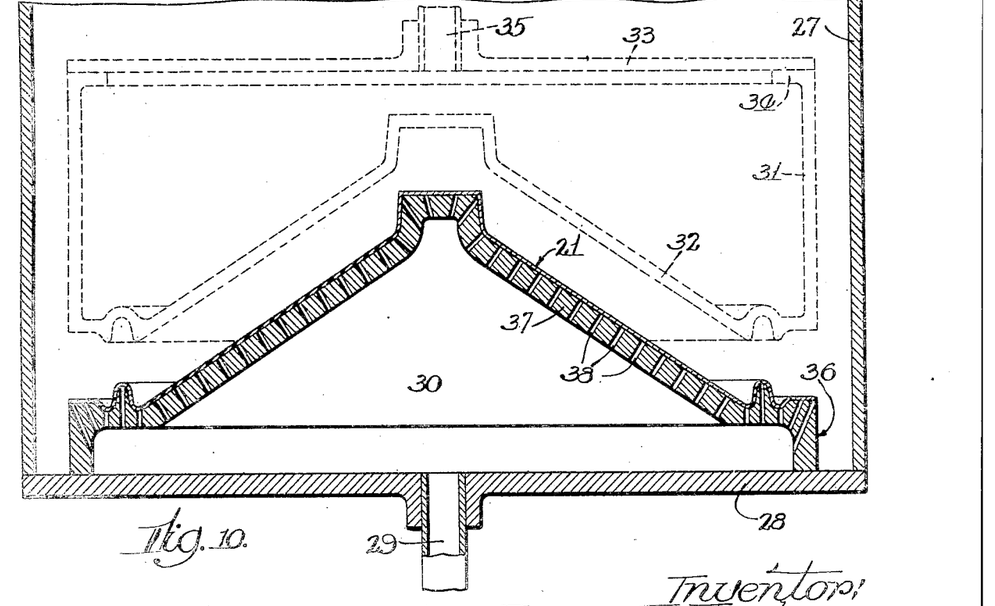
Fig. 10 is a similar view showing a means for drying the blank after transference by a removing means to a drying die.

The drying is effected by drawing hot air or hot gases through the blank 21 and the apertures 38 of the male die. After drying, the blank is trimmed and treated to produce the finished article.

Figure 11:
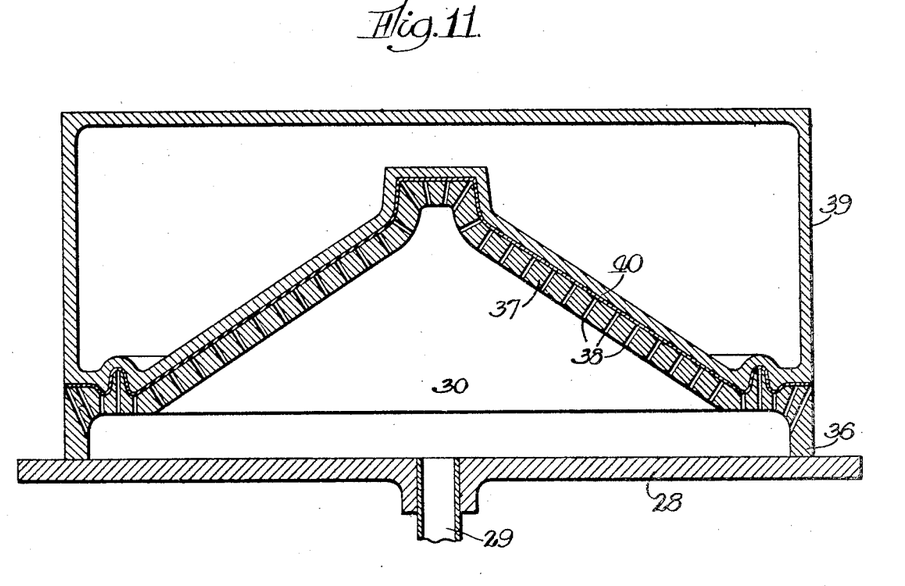
Fig. 11 is a similar view showing the use of a hot die.

Drying may be effected by the use of a hot die Such a die is shown in Fig. 11. It may be solid or hollow as desired. It preferably is a female die having a body portion 39 and a contoured face 40 conforming to the contour of the blank 21 placed upon the porous male die 36. This hot die may be engaged with the blank under any desired pressure. This will compress and compact the fibrous material while it is being dried, thus producing a cone member which is more or less dense in accordance with the pressure used. The steam, vapors, moisture and the like produced during the drying are removed by the suction acting through the porous male die 36. After the drying is completed, the hot die is removed, and the suction in the male die 36 reversed to a pressure to blow off the dried blank. The latter may then be trimmed and treated to effect the finished article.

When it is desired to produce a softer and less dense article, the hot die need not be applied with pressure, but its face 40 may simply contact the blank 21 or be located merely in close proximity with the blank 21 so as to heat the blank for drying without compressing it. In this case, the steam produced in the material of the blank will fluff it and make the blank softer and thicker yet with the same light weight. The steam, vapors, moisture and the like are drawn off by the suction acting through the porous male die 36. When the drying is completed the hot die is removed and the dried blank blown off by pressure acting through the male die. The blank may then be treated and trimmed to effect the finished product.

Another method of drying may be used. The blank may be first dried by the normal temperature of the air or atmosphere, and upon its original former shown in Fig. 7, or upon the porous male die shown in Fig. 10. During the drying in this way, different parts of the blank may dry more quickly than other parts and thus the blank may contract unequally or become bulgy at parts. To counter-act this and to restore the blank to its normal and original shape, a hot female die, such as that shown in Fig. 11, is applied to the blank with or without pressure as above described. This effects a setting of the shape of the blank to its normal original form and condition. No suction is necessary in this case. After removing the hot die, pressure acting through the male die may blow off the blank which may then be trimmed and treated to effect the finished product.

For making the cones with inturned nipples $2^a$, such means as shown in Figs. 12 to 16 may be used. In this case there is provided a porous former comprising a cone-shaped body portion 41, a recessed part 42, a border portion 43, an intermediate undulated portion or juncture 44, a depending flange portion 45, the latter resting upon the table 7 and holding the former spaced therefrom to provide a chamber in the space between the former and the table.

Figure 12:
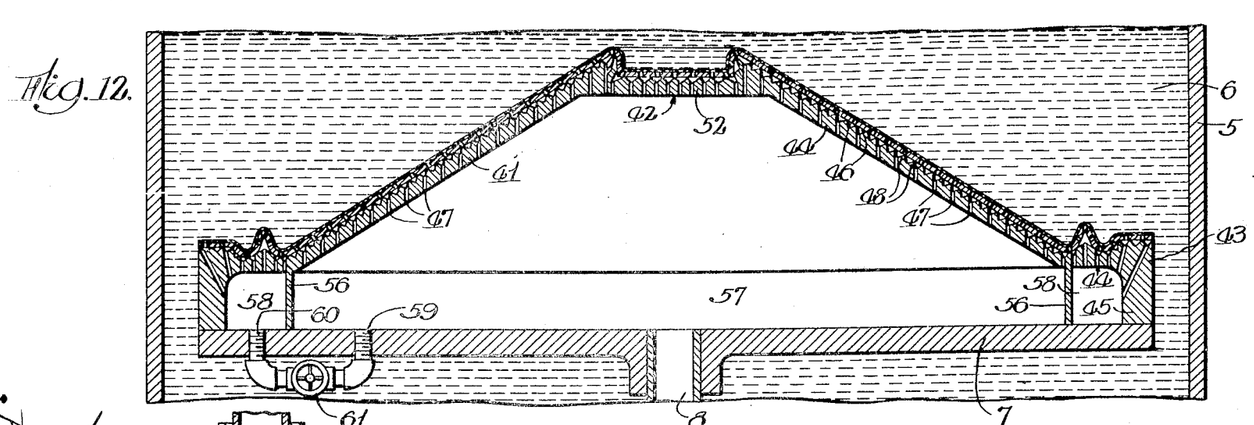
Fig. 12 is a transverse sectional view of a device including a porous former for making such members as shown in Figs. 4, 5 and 6.
Figures 13, 14:
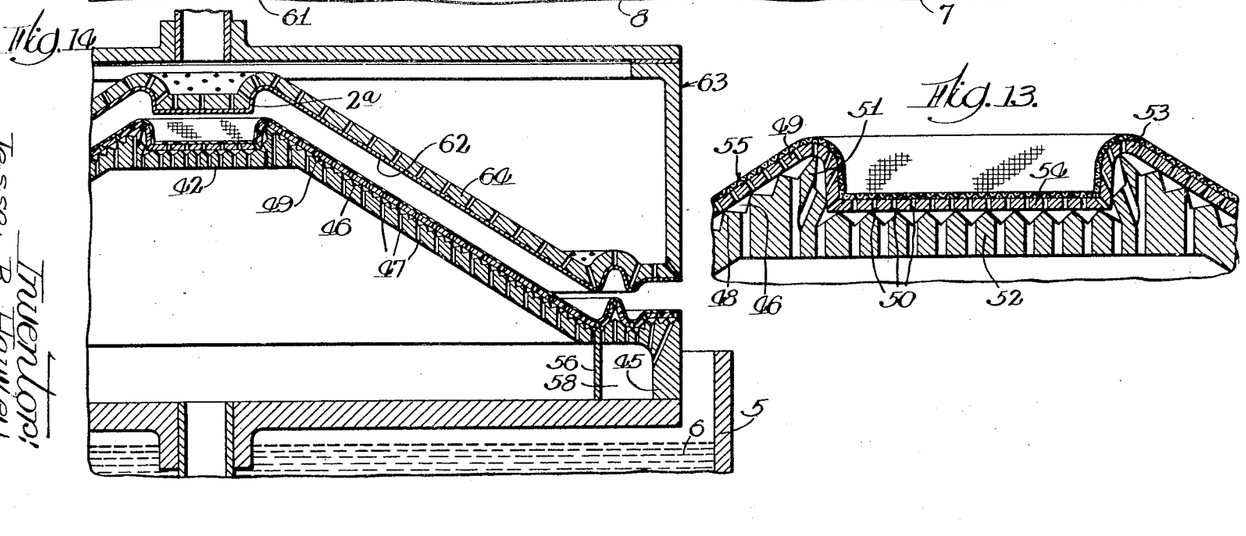
Fig. 13 is a fragmentary sectional view on an enlarged scale of a modification of the former shown in Fig. 12.
Fig. 14 is a transverse sectional view of a forming means and a means for removing a blank from the forming means.

The outer surface of the former is provided with a number of grooves 46 communicating with apertures 47 provided in the former. These grooves and apertures function to drain away the water of the bath when the fibrous material is deposited upon the former from the bath 6 of the vat 5. Between the grooves are provided ridges 48 upon which is supported a contoured thin sheet 49, preferably of metal, provided with a large number of small apertures 50 throughout the sheet. This sheet is contoured to conform with the outer surfaces of the former. At the apical portion of the former, is formed a crater rim 51 to surround a recess having a bottom 52. Likewise, the sheet 49 has a rim portion 53 and a bottom portion 54.

Upon the sheet 49 may be located a contoured fine mesh or reticulated sheet 55, this sheet being contoured to conform with the sheet 49. The sheet 55 is not essential and may be omitted, the molding being effected on the porous sheet 49 in such case. When the sheet 55 is used, the removal of the blank is usually more facile.

Different portions of the deposit molded upon the porous former, may be subjected to different pressures during the molding operation. For effecting this, the juncture portion 45 of the former, is integrally formed with a depending annular flange or partition 56 adapted to seat upon the table 7. In this way a chamber 57 is enclosed between the table and the former and within the partition 56, and another chamber is enclosed between the partition 56 and the flange 45, and the table 7 and the border portion 43. Besides being apertured to receive a suction pipe 8, the table 7 is also apertured to receive pipes 59 and 60 respectively communicating with chambers 57 and 58, and both being connected to a valve 61.

The depositing of the fibres upon this former is similar to the method disclosed in connection with the form of device shown in Figs. 7 and 8. By reason of forming the former with a depression or reflexed part at the apical part of the former, the blank 62 integrated on the former will have an inturned neck $2^a$. In other respects the blank will be the same as that formed on the former shown in Figs. 7 and 8.

After the blank 62 is formed, it may be dried in a manner described above in connection with Fig. 10, by placing the former with the blank upon the table 28 in the drier 27, and by sucking hot gases or air through the blank and the former, or the wet blank may be removed from the former (see Fig. 14) by a hollow female die 63 having an apertured contoured face or wall 64 conforming to the contour of the wet blank. The die 63 is brought into contact with the wet blank, and with a suction in the die the blank is made to cling to the wall 64 and be lifted with it when the die is lifted.

Figure 15:
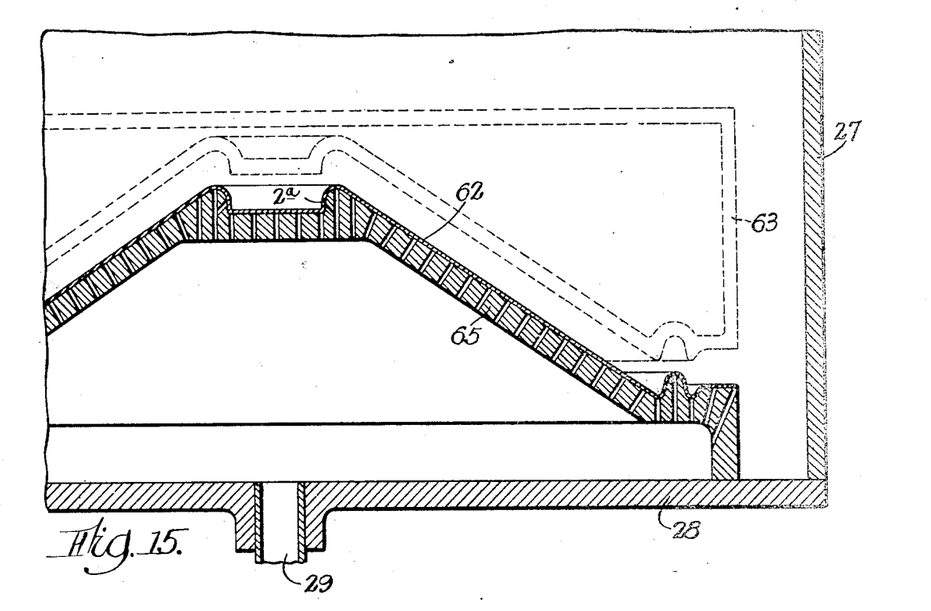
Fig. 15 is a similar view showing a means for drying the blank after transference by a removing to a drying die.
Figure 16:
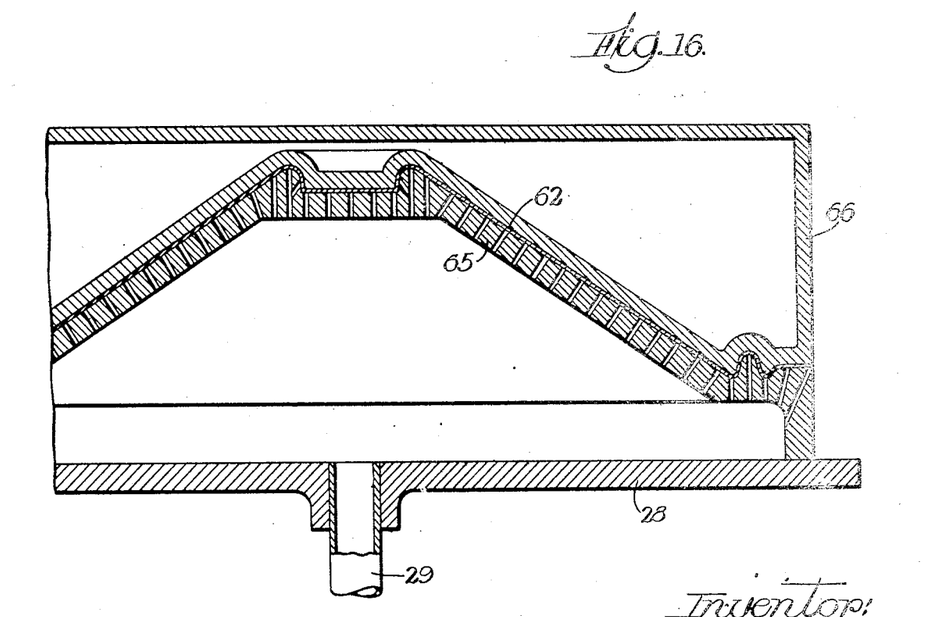
Fig. 16 is a similar view showing the use of a hot die.

This die and blank then may be transferred to the drier or heater 27, where there is located a hollow porous male die 65 on the table 28. The blank is transferred to the die 65 by cutting off the suction in the die 63 and creating a suction in the die 65, the continued suction in the die 65 acting to draw hot gases through the blank to dry it.

Instead of drawing hot gases through the blank to dry, a drying may be effected by a hot female die 66, similar to that shown in Fig. 11. With the blank on the die 65 (see Fig. 16) the hot die 66 is brought into contact with the blank, and suction in the die 65 will withdraw the steam, vapors, moisture and the like. Either pressure may be applied or mere contact made by the hot die 66 to or with the blank for the same purposes above described in connection with Fig. 11.

The dried blank is then treated as above indicated.

In the treating of the blank, a stiffening substance in liquid form is preferably applied to the apical part 1, or $1^a$, or $1^b$ of the cone. This is for the purpose of making this part of the cone stiff so that when the vibratile portion is vibrated, it will not flex but will efficiently propagate and generate sound waves without dissipating losses. If desired the whole member may be treated with any suitable water-proofing material as by impregnating the member with such material, either by dipping, spraying or otherwise. The undulated portion 4 may be compressed or scored so as to make this part more pliable or supple and thus enhance the freedom of vibration of the vibratile part.

While I have herein described and upon the drawing shown a few illustrative forms of diaphragmatic members produced by my invention and illustrative means for effecting the same and also illustrative methods of making the same, it is to be understood that the invention is not limited thereto, but may comprehend other forms, construction, details, arrangements of parts, process steps, and features without departing from the spirit thereof.

Having thus disclosed the invention, I claim:

1. A sound reproducing member comprising vibratile and supporting portions of integrated fibrous material, the material of the vibratile portion being so integrated as to be stiffer than that of the supporting portion.

2. A sound reproducing member comprising vibratile and supporting portions of integrated fibrous material, said vibratile portion being so integrated as to be stiff and said supporting portion being so integrated as to be pliant.

3. In a process of making a sound reproducing member, the steps of forming by accretion and integration from a bath of fibrous material a stratum of fibrous material upon a contoured porous former to form a unitary integral unit, and subjecting different areal portions of said former to different pressures to effect different thicknesses of deposit of said unit.

4. In a process of making a sound reproducing member, the steps of accreting and integrating a contoured stratum of fibrous material, and so accreting and integrating a portion with a different pressure as to render said portion pliable.

5. A sound reproducing member of integrated fibrous material and formed in one layer of mixed hard and soft fibres.

6. A sound reproducing member of integrated fibrous material and formed in one layer of differently constituted fibres.

7. In a process of making a sound reproducing member, the steps of submerging a contoured porous former in a bath of fibrous material, effecting a differential of pressure on different areal parts of the accreting surface of said former to effect a deposit of fibrous material in a stratum on said former, and drying said stratum.

8. A former for making fibrous members, comprising a contoured porous member provided with chambers, and means for producing a differential of pressures in said chambers.

9. A sound reproducing member in the form of a contoured sheet of integral fibrous material having a fluffed condition.

10. In a process of making a sound reproducing member, the steps of molding said member upon a porous former from fibrous material, and placing the molded member in close proximity to a heated die to dry and fluff said member.

11. In a process of making a sound reproducing member, the steps of producing suction to mold said member of fibrous material upon a porous former, and applying greater suction to a portion of said molded member to effect a greater density in said portion.

12. A sound reproducing member composed of molded fibrous material and comprising a vibratile portion, a supporting portion, and a juncture, said juncture being denser and thinner than said vibratile and supporting portions.

13. In a process of making a sound reproducing member, the step of molding by accretion and integration fibrous material upon a porous former and while so molding subjecting different areal portions of the material being molded to different pressures.

JESSE B. HAWLEY.